July 23, 1963        W. T. MURPHY        3,098,658
GOLF BALL HAVING A POLYETHERURETHANE CORE
Filed Nov. 12, 1958
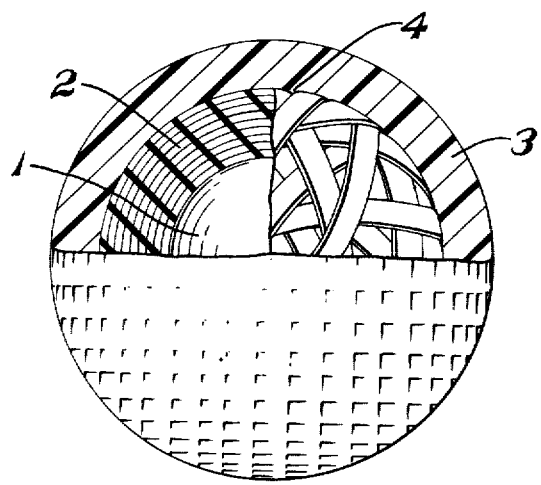
INVENTOR.
WALTER T. MURPHY
BY
ATTY.

United States Patent Office 3,098,658
Patented July 23, 1963

3,098,658
GOLF BALL HAVING A POLYETHER-
URETHANE CORE
Walter T. Murphy, Cuyahoga Falls, Ohio, assignor to
The B. F. Goodrich Company, New York, N.Y., a
corporation of New York
Filed Nov. 12, 1958, Ser. No. 773,482
5 Claims. (Cl. 273—230)

This invention relates to articles of manufacture embodying polyetherurethane compositions. More particularly, the present invention relates to articles of manufacture, for example, golf balls having cores of cast, thermosetting and highly resilient polyetherurethane compositions.

Golf ball cores are normally made of natural rubber, rubbery butadiene-styrene copolymers or mixtures of these rubbers. While these core materials are somewhat resilient, they exhibit a drop rebound of only 50–60. "Drop rebound" is determined by measuring the rebound of a core from a 100 inch free fall onto a concrete base. They, also, require a considerable amount of handling such as milling and press curing. On the other hand there are many other synthetic materials which are elastic, resilient to some degree, and rubbery, such as the polyurethanes, but so far none of these materials has provided a resilience higher than the rubbers. Moreover, many of these materials such as the rubbery polyurethanes must be mill mixed and then press molded which requires considerable equipment and labor. It would be very desirable to provide a highly resilient material which is especially useful for golf ball cores and which could be handled with simple mixing and casting equipment and which would not require heavy cumbersome rubber mill machinery nor the use of high pressure molding.

Accordingly, it is a primary object of the present invention to provide a golf ball core from a composition of matter which is readily prepared, which can be molded without the necessity of employing high pressure and which is very resilient.

Another object of the present invention is to provide a golf ball core which does not require high pressure molding to develop its optimum properties.

A further object of this invention is to provide a highly resilient article of manufacture such as a playing ball and, more particularly, a golf ball having a core of a highly resilient material.

These and other objects and advantages of the present invention will become more apparent to those skilled in the art from the following detailed description, examples and accompanying drawing which is an elevation partly in section of a golf ball containing the core of the present invention.

It has been discovered according to the present invention that a polyetherurethane material, useful as a golf ball core, may be obtained by the reaction of 2 chemical equivalents of a polyalkylene ether glycol having an average molecular weight of from about 1,000 to 5,000 and having from 4 to 8 carbon atoms in its alkylene groups, from about 0.45 to 2.0 chemical equivalents of an aliphatic polyol having from 3 to 40 carbon atoms and from 3 to 8 hydroxyl radicals selected from the group consisting of primary and secondary hydroxyl radicals and being free of nitro groups and amino hydrogen atoms, and from about 2.45 to 4.0 equivalents of an aromatic diisocyanate, where the equivalents of said diisocyanate are at least equal to the total equivalents of the glycol and the polyol. A melt of this polyetherurethane remains fluid for substantial periods of time so that it may readily be cast into molds and heated without pressure for the desired time to complete the reaction (curing, cross-linking and the like). It is dimensionally stable, thermosetting, and highly resilient. In fact, cores of such material have exhibited a drop rebound of about 90% as compared to 60% for a conventional rubber golf ball core. Moreover, golf balls containing cores of the polyetherurethane of the present invention have travelled further (up to about 7 yards) upon being driven as compared to similar balls having rubber composition cores. As shown in the drawing, a golf ball made in accordance with the present invention generally comprises the novel polyetherurethane core 1 of the present invention, tension wrapped cured rubber, nylon or other thread composition center 2 and a cover composition 3 which may be of balata, gutta percha or the like resinous materials or mixtures of such materials and natural or synthetic rubbers such as butadiene-1,3/styrene copolymers, chlorobutadiene polymers and copolymers, butadiene-1,3/acrylonitrile copolymers, polyisoprene and the like. In place of the balata type resins, synthetic resins well known to the trade such as the high styrene-butadiene type resins may be used. The cover may also be of nylon. The cover is shown at 4 to have fused or melted and flowed between the outer threads of the center to provide greater adherence between the cover and the center.

The polyalkylene ether glycols used in the practice of the present invention are those which are derived from alkylene oxides, glycols, heterocyclic ethers and other materials by polymerization, copolymerization and the like. For example, tetrahydrofurane may be polymerized in the presence of catalytic amounts of fluorosulphonic acid to make polytetramethylene ether glycol having the formula $HO(-CH_2-CH_2-CH_2-CH_2-O-)_nH$ where $n$ is an integer. Glycols may be polymerized in the presence of mineral acids, sulfonic acids or fuller's earth. Still other methods well known to the art may be utilized in the preparation of these polyalkylene ether glycols.

The polyalkylene ether glycol should be a liquid at a temperature below about 100° C. and have an average molecular weight of from about 1,000 to 5,000, preferably about 3,000. The glycol, also should have terminal primary and/or secondary hydroxyl groups. The alkylene radicals of the glycol should have at least 4 carbon atoms and may have as high as 8 carbon atoms; they, preferably, have from 4 to 6 carbon atoms to provide the best degree of resilience; and they should have a straight chain of at least 4 carbon atoms between oxygen atoms. The glycols, thus, may be represented by the formula $HO(-R-O-)_nH$ where R is an alkylene group of from 4 to 8 or 4 to 6 carbon atoms and where $n$ is an integer. Useful examples of polyalkylene ether glycols are polytetramethylene ether glycol, polypentamethylene ether glycol, poly-1,4-amylene ether glycol, polyhexamethylene ether glycol, polyheptamethylene ether glycol, polyoctamethylene ether glycol, poly-1,6-octamethylene ether glycol and the like.

The polyol used as a cross-linking reagent in the reaction forming the castable, thermosetting polyetherurethanes of the present invention should be a liquid below about 100° C. and/or soluble in the polyalkylene ether glycol employed. Moreover, the hydroxyl radicals of the polyol should be primary and/or secondary hydroxyl radicals, i.e.,

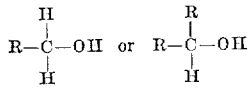

where R is aliphatic. Polyols containing only tertiary hydroxyl radicals, for example,

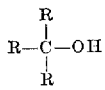

should not be used as they are not sufficiently reactive to provide proper curing to obtain a resilient solid thermosetting polyetherurethane. Furthermore, the useful polyol should contain at least 3 primary and/or secondary hydroxyl radicals to obtain branching or a three dimensional network in the finished polymer and at least 3 carbon atoms to obtain the desired compatibility. The polyol, also, may contain up to 40 carbon atoms; however, at such large carbon atom contents, it should contain more hydroxyl radicals, i.e., up to 8 reactive hydroxyl radicals. On the other hand, the polyol should not contain nitro groups or amino hydrogen atoms, i.e., hydrogen attached directly to nitrogen atoms, as these provide dead, not resilient materials. Illustrative examples of useful polyols for practicing the present invention are glycerol, 1,2,4-butanetriol, trimethylol ethane, trimethylol propane, phenyl trimethylol methane, 1,1,1-trimethylol-2,4,4-trimethyl pentane, 1,1,1-trimethylol hexane, pentaerythrityl monooleate, N,N,N',N'-tetrakis (2-hydroxy propyl) ethylene diamine and the like. It, thus, is seen that the polyol employed is generally aliphatic in nature although it can contain aromatic or other substituents and, preferably, consists of carbon, hydrogen and oxygen. The polyols are employed in an amount of from about 0.45 to 2.0 chemical equivalents for every 2.0 equivalents of the polyalkylene ether glycol used. The polyols may be used singly or in mixtures.

The diisocyanates employed are aromatic diisocyanates which are soluble in the polyalkylene ether glycol and, preferably, which are also liquid at a temperature below about 100° C. Examples of useful diisocyanates are tolylene-2,4-diisocyanate, tolylene-2,6-diisocyanate, diphenylmethane-p,p'-diisocyanate, meta-phenylene diisocyanate, para-phenylene diisocyanate, naphthalene diisocyanate, dimethyl diphenyl methane diisocyanate, bitolylene diisocyanate and the like and mixtures thereof such as an 80–20 mixture of 2,4- and 2,6-tolylene diisocyanates, or a 65–35 mixture of 2,4- and 2,6-tolylene diisocyanates, or other mixtures of diisocyanates. A group of preferred diisocyanates are those having the formula

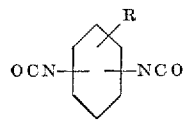

where R is selected from the group consisting of hydrogen, methyl, ethyl, propyl, isopropyl, butyl, amyl, hexyl and the other lower alkyl radicals. Isocyanates having more than two —NCO groups are not desired as they are too reactive to enable the attainment of a castable material. Since aliphatic diisocyanates do not provide high resilience and since blocked diisocyanates cause blowing, they are unsatisfactory and should not be employed. The diisocyanates are used in an amount of from about 2.45 to 4.0 chemical equivalents, preferably about 3.0 equivalents, for every 2.0 equivalents of the polyalkylene ether glycol present. Moreover, the equivalents of the diisocyanate should be equal to or greater than the sum of the equivalents of the polyalkylene ether glycol and the polyol employed.

Outside of the chemical equivalent ratios of glycol, polyol and diisocyanate shown above the highly resilient, castable products of the present invention cannot be obtained.

Catalysts may be employed to speed the curing of the polyetherurethane although in some instances a slight loss in resilience or rebound may be observed in the finally cured product. Catalysts, also, are advantageous to use when it is desired to reduce the overall curing time in molds or after gelling in the oven, and, thus, they facilitate the reuse of equipment while reducing heating costs. Catalysts are particulay desirable to use where the polyol contains a large proportion of or contains only secondary hldroxyl radicals. In some cases as when a loading pigment such as green chrome oxide ($Cr_2O_3$) is used with the catalyst, an increase in resilience is observed. The catalysts are used in minor amounts of from about 0.001 to 2.0% by weight based on the weight of the polyetherurethane but can be used in other amounts as found expedient. Some examples of well known catalysts for the polyurethane reaction are triethylamine, N-methylmorpholine, N,N'-(2-hydroxypropyl)-2-methyl-piperazine, N,N'-diethyl-2-methylpiperazine, N-2-hydroxypropyldimethyl morpholine, dimethylethanolamine and other tertiary amine catalysts. Still other catalysts can be used as the alkali metal salts of organic acids. Examples of such salts are the lithium, sodium, potassium, rubidium and cesium acetates, propionates, butyrates, isobutyrates, valerates, caproates, heptylates, caprylates, pelargonates, laurates, stearates, benzoates, anisates, naphthoates, adipates, glutarates, sebacates and the like and mixtures of the same.

When it is desired to increase the density of the composition of the present invention which may have a specific gravity of about 1, it is necessary to use loading fillers or pigments. For example, in the case of golf balls, it may be necessary to increase the density of the core in order to get the required properties if all the organic materials used in the golf ball do not provide the desired density. For example, finished golf balls have a weight of about 1.62 oz. (max.), a size of at least about 1.68 in. (min.) and an overall gravity of about 1.1. Since the cover and the thread of the center cannot be loaded appreciably without affecting their properties, it is usually necessary to load the core. As the size of the core may vary, for example from about 1¼" to 1¼₆" the specific gravity of the core will vary inversely from about 1.4 to 1.5. Thus, the density to be obtained will depend on the weight of the pigment added, the size of the core and the density of the polyetherurethane. For most purposes, it has been found desirable to vary the amount of the pigment from about 25 to 100 parts by weight per 100 parts by weight of the polyetherurethane, or reactants forming the urethane, where the pigment has a density of from about 5 to 9. This range can vary somewhat depending on the factors mentioned above although large amounts should be avoided as they tend to make the composition so viscous that it cannot be poured.

The loading filler or pigment should have a specific gravity of at least about 5. Pigments having specific gravities of less than about 5 are so light that larger quantities must be used which detract from the casting properties of the present composition, that is, it becomes too viscous, and, also, may detract from the physical properties of the finished core. Moreover, the pigment should be inert and preferably essentially neutral in aqueous media. While slightly acid or basic pigments may be employed they should not be strongly acidic nor basic as this will cause gelation before the polyetherurethane can be cast or will undesirably inhibit the reaction. It has been found best to use a pigment which is essentially neutral, that is, one having a pH of about 7 in aqueous media. Furthermore, the pigment should be finely divided or particulate so that it will disperse readily throughout the reaction mixture and will not tend to settle out on standing or while curing. Coarse particles tend to settle out and shift the center of gravity as well as preventing the obtainment of the best physical properties. It is preferred that about 90% of the pigment particles pass a 100 mesh U.S.S. screen where the best dispersions have been obtained. Useful pigments have been found to be finely divided metals and metal oxides. Examples of these loading fillers or pigments are red iron oxide ($Fe_2O_3$), green chrome oxide ($Cr_2O_3$), iron and nickel and the like and mixtures of the same. Still other pigments meeting the aforementioned requirements may be used.

The reactants should be free of those impurities which would tend to adversely accelerate or retard the reaction forming the polyetherurethane. For example, some polyether glycols may be so reactive that when mixed with the diisocyanate and polyol, the composition rapidly gels so that castings cannot be made. While advantage may be taken of such reactivities, it is best to start with pure or essentially pure materials and then to add the necessary activators or inhibitors so as to properly control the reaction to obtain the desired results. To purify the polyether glycols, they may be washed with deionized water or treated with ion exchange agents or adsorbents or a combination of these materials. It is not desired to distill the polyether glycols as their molecular weights may be changed. The polyols may be recrystallized or distilled to purify them and the disocyanates may be distilled. The catalysts and fillers may also be purified by methods well known to the art.

The compositions of the present invention may contain minor amounts of color pigments and dyes, age resistors, stabilizers, fungicides and so forth.

In the method of preparing the polyetherurethanes of the present invention, the polyether glycol is degassed, usually by applying a vacuum, or treated to render it anhydrous or essentially anhydrous. If solid, it must first be melted. It then is mixed with the diisocyanate under anhydrous conditions or while degassing at a temperature sufficient to maintain the ingredients, such as the glycol, liquid and preferably at a temperature of about 100° C. At this stage a prepolymer (isocyanate chain extended polyalkylene ether glycol) is obtained which may be kept for extended periods of time. Next the dry polyol is added to the reaction mixture, stirring and degassing to remove any bubbles are continued for a few minutes at 100° C., and the mixture is poured into molds which are then closed or which are so constructed that air or oxidizing gases cannot attack the core materials and placed in an oven to cure or to complete the reaction at about 110–150° C. for varying periods of time. It is not necessary that the molds be pressurized as is the case when rubbery compositions, such as natural rubber compositions, are cured.

After the polyetherurethane has cured or reacted sufficiently so that it has gelled or is dimensionally stable, it may then be removed from the mold and given an oven cure at about 110–150° C. preferably under a nitrogen or other inert (non-oxidizing or essentially non-oxidizing) atmosphere for as long as needed to obtain the desired properties. A feature of the method of the present invention is that it is not necessary to complete curing in molds but the polymer may be removed from the mold during the curing process and curing completed while unrestrained.

In place of reacting the polyether glycol and diisocyanate and then the polyol, all three reactants may be mixed together at once. Another method is to add the polyol to the polyether glycol and then mix in the diisocyanate. The pigment may be added at any stage of the reaction prior to casting, but it is preferably added to the polyether glycol melt to obtain a good dispersion before the reaction mass tends to thicken. The catalyst, if used, should be added last or with the polyol if the polyol is added to the prepolymer. Instead of first melting the glycol and then adding the diisocyanate and polyol, all three reactants may be separately melted if not fluid and injected simultaneously or separately under pressure into the mold so that mixing is achieved in a short time. Other methods of handling the reactants may be used.

Mixing of the reactants should be done under anhydrous conditions to avoid premature gelling by water or water vapor which would prevent casting and to avoid foaming or the development of pores. Since degradation of the polymer by oxygen will occur if heated in air at high temperatures for extended periods, heating should be done in closed molds or in a non-oxidizing or essentially non-oxidizing atmosphere until curing is completed. However, after mold and oven curing have proceeded to completion so that a resilient well cross-linked polyetherurethane is obtained, the polymer may be further aged at 25–30° C. in air or water for varying times which provides an increase in resilience or rebound (up to several percent in some cases).

Alternatively, the composition may be cast into hemispherical core molds which are then covered with cover plates. One set of the covered molds can be heated to gel the castings while the other set is left to cool or is unheated. After gelling of the castings in the first set of molds, the covers of all the molds can be removed and the first set inverted and placed over the second set so that the gelled castings contact the ungelled castings. The molds then are locked and heating continued to complete the curing of the spherical cores.

Hollow cores, i.e., cores having a small hole in the center of the core (for liquid filled cores), can be made in much the same manner as described in the foregoing paragraph except that the cover plates can have small indentations equivalent to a hollow hemisphere disposed inwardly and centrally in their surfaces and both sets of covered molds can be heated to completely cure the hemispherical cores. After curing a capsule containing a liquid can be placed in the indentation in the core, the cores treated with a cement and joined together. In another method, the capsule can be omitted and a suitable liquid injected by a hypodermic needle into the hole in the core.

Suitable cements can be polyesterurethane or polyetherurethane cements. An example of one useful cement is the reaction product of 1 mol of polytetramethylene adipate, 1 mol of butanediol-1,4 and 2 mols of p,p'-diphenyl methane diisocyanate dissolved in tetrahydrofurane.

Another useful cement or adhesive is a solution of a polyaryl polyisocyanate, known as "Papi-1" (The Carwin Company, North Haven, Conn.), having the general formula

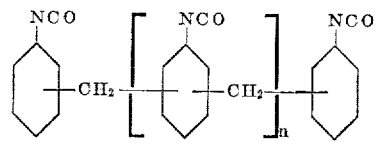

where $n$ has an average value of 1.

Liquids for injection into the hollow cores may be water, sugar solutions, salt solutions, a dispersion of white lead in oil, glycerine, glue-glycerine mixtures. Any incompressible material which is a good energy reservoir, such as a liquid or a rubbery material, can be used in the hollow center of the core.

It will be appreciated that where liquid or other hollow center cores are made, proper adjustment in the density of the core should be made by suitable compounding of the casting composition.

When making a golf ball the polyetherurethane composition containing the required amount of high density loading pigment is cast or pumped into spherical molds having the desired size and cured as described above. After curing, the core may then be wrapped with cured rubber thread under tension in the customary manner to obtain the desired diameter. This thread wrapped core is called the center. The center is then placed between cover shells of the desired thickness and comprising a balata or a resin type cover composition containing, if desired, curing agents, accelerators, color pigments and the like and inserted in a cold mold. Steam and pressure are applied for from about 2 to 4 minutes, cold water is then applied to the mold and the covered ball allowed to cool in the mold under pressure. The total cycle is about 6 to 8 minutes at a maximum temperature of about 225° F. After cooling, the balls are removed from the mold and painted if desired. The covered ball may also be irradiated with high speed electrons, X-rays, or other ray energy to improve the properties of the cover. Irradiated covered balls have exhibited increases in cut resistance and driving distance. It will be appreciated that the method of making the golf ball can be varied to some extent with achievement of comparable results.

While the present invention has been described with particular reference to the production of a highly resilient golf ball core, it will be appreciated that the novel polyurethane composition disclosed herein and method for making the same can be used to make playing balls generally, hollow or solid, resilient bumpers, shoe soling similar to crepe rubber, rubber bands, shock absorbers, children's toys and other articles where a highly resilient polymer is indicated. The composition of the present invention is particularly useful where articles can be made by casting, pouring, spreading and the like.

The following examples will serve to illustrate the invention with more particularity to those skilled in the art:

EXAMPLE I 1 mol of polytetramethylene ether glycol (duPont Teracol 30), previously purified, and having an average molecular weight of about 3,000 was heated in a glass reactor to about 110° C. and stirred under a vacuum (5 mm. Hg) to dry it. The vacuum was then released and the polyether glycol was cooled to 100° C. when 1.5 mols of p-phenylene diisocyanate were added. The polyether glycol and diisocyanate were then mixed at 100° C. with a mechanical stirrer. After 12 minutes, 0.25 mol of trimethylol propane was added and the resulting mixture, after being stirred at normal pressure for four minutes, was degassed while stirring under vacuum (5 mm. Hg). When heavy foaming had ceased, about 2 minutes, the vacuum was released. A light bubble-free fluid melt was obtained. This melt remains fluid at 100° C. for about 30 minutes. The melt was then poured into molds maintained at 130° C. and cured for 16 hours at 130° C. in these molds without pressure. Finally, the castings were removed from the molds and allowed to age in air at room temperature. Physical testing of the cured and molded polyetherurethane gave the following results:

| A. Room Temperature Micro Stress Strain | | Elongation, Percent |
|---|---|---|
| 300% Modulus | Tensile Strength, p.s.i. | |
| 550 | 1250 | 425 |

B. Yersley Resilience at Room Temperature=93%. (Drop rebound= 88%. Drop rebound is determined by dropping a ball from a given height and measuring the distance of vertical rebound. It is expressed as a percent of original height.)

C. Specific Gravity $\frac{23.8°\ C.}{23.8}$ = 1.020.

EXAMPLE II

The method of this example was the same as that of Example I, above, except that various polyethylene ether glycols having average molecular weights of from 500 to 4,000 and poly(1,2-)propylene ether glycols having average molecular weights of from 1,000 to 2,500 were used in place of the polytetramethylene ether glycol to make various castings. In each case the stress strain values of the resulting castings varied from poor to fair but the drop rebounds of the polyethylene ether glycol urethanes was only 30% while the drop rebounds of the polypropylene ether glycol urethanes was only 10%. These compositions, thus, were essentially "dead." The results of this example show that there must be at least 4 carbon atoms in the alkylene groups of the polyalkylene ether glycol to obtain the resilience deemed necessary for golf ball cores.

EXAMPLE III

The method of this example was the same as that of Example I, above, except that the trimethylol propane was substituted in one run by "Quadrol" (N,N,N',N'-tetrakis(2-hydroxy propyl) ethylene diamine—Wyandotte Chemical Company) and in another run by "Hyprose" SP-80 (sucrose reacted with eight equivalents of propylene oxide to give a compound having 36 carbon atoms and 8 reactive hydroxyl groups—Dow Chemical Company). The resulting castings exhibited satisfactory stress strain characteristics and drop rebounds of about 80% so that they were satisfactory as golf ball core materials. This example shows that other polyols as described above are satisfactory.

EXAMPLE IV

The method of this example was the same as Example I, above, except that the trimethylol propane was separately entirely substituted by butanediol-1,4,1,3-acetyl methyl urea, and tris hydroxyl methyl nitro methane. In each case the resulting castings exhibited drop rebounds below about 40% and, thus, were unsatisfactory. Moreover, when pentaerythritol and polyvinyl alcohol were tried as substitutes for the trimethylol propane, they would not dissolve in the reaction medium and would not provide useful, castable, thermosetting polyetherurethanes. This example clearly shows that the use of polyols which do not have the characteristics set forth supra will not provide applicant's results.

EXAMPLE V

The method of this example was the same as that of Example I, above, except that polyethylene adipate, a polyester, having a molecular weight of about 2,000 was used in place of the polytetramethylene ether glycol. While the resulting polyesterurethane exhibited satisfactory stress strain properties, it exhibited a drop rebound of only 60% and was not useful as a highly resilient golf ball core material. This example illustrates the fact that polyesters do not make polyurethane golf ball core materials which are equivalent to those made from polyalkylene ether glycols of the present invention.

EXAMPLE VI

The method of this example was the same as that of Example I, above, except that (1) 2,4-tolylene diisocyanate, (2) an 80/20 mixture of 2,4- and 2,6-tolylene diisocyanates, (3) a 65/35 mixture of 2,4- and 2,6-tolylene diisocyanates and (4) p,p'-diphenyl methane diisocyanate were separately substituted for the p-phenylene diisocyanate. In each case satisfactory polyetherurethane golf ball core materials were obtained, exhibiting stress strain properties and resiliences almost identical to those shown by the polyetherurethane of Example I. This example discloses that other diisocyanates as defined above will provide satisfactory results.

EXAMPLE VII

The method of this example was the same as Example I, above, except that the composition was cured in closed or covered molds for 4 hours at about 160° C., removed from the molds where it was observed to be gelled and dimensionally stable and heated under nitrogen in the oven for 16 hours to further advance the cure. A similar composition but containing 0.01% by weight of potassium acetate based on the weight of the polyetherurethane was also cured in the mold and under nitrogen but required only 1 hour curing in the closed mold as compared to four hours curing required by the composition which did not contain the potassium acetate. The stress strain properties of the cured compositions were essentially the same. However, the composition containing the catalyst exhibited a resilience of 90% as compared to 93% for the other composition. This example illustrates the desirability of using a catalyst to facilitate the time of curing of the novel polyetherurethanes of the present invention with substantial retention of the resilience.

EXAMPLE VIII

A resilient polyetherurethane was prepared according to the general method of Example I, above, using the reactants in the following amounts:

| Reactant: | Parts by weight |
| --- | --- |
| Polytetramethylene ether glycol (Teracol #30– M.W. about 3,000) | 63.31 |
| p-Phenylene diisocyanate | 5.06 |
| Trimethylol propane | 0.71 |

After curing, the resulting product exhibited a specific gravity of 1.02 and a drop rebound of 87%. When a similar composition was reacted and cured except that it contained additionally 30.71 parts by weight of red iron oxide dust, it exhibited a density of 1.36 and a drop rebound of 87%. In this case a desired increase in density was obtained without impairing the resilience of the castable polyetherurethane composition.

EXAMPLE IX

The method of this example was essentially the same as Example VIII, above, except that powdered green chrome oxide ($Cr_2O_3$) was used in place of the iron oxide. The reactants used and their proportions are set forth below:

| Reactant: | Parts by weight |
| --- | --- |
| Polytetramethylene ether glycol (Teracol #30–M.W. about 3,200) | 100.00 |
| p-Phenylene diisocyanate | 7.5 |
| Trimethylol propane | 1.03 |
| Green chrome oxide | 48.8 |

When the polyetherurethane composition was cured, it exhibited a specific gravity of about 1.5 and a drop rebound of 85%. When 0.01% by weight of potassium acetate, based on the weight of the polyetherurethane reactants, was added to a similar composition, a cured product was obtained having a similar density but a drop rebound of 90%. This example illustrates that in certain instances the incorporation of a catalyst into the reaction mixture will serve to increase the resilience or rebound of the polyetherurethane obtained.

EXAMPLE X

The method of this example was similar to the method of Example VIII, above, except that finely divided lead oxide was used in place of iron oxide. However, the composition gelled almost at once after the lead oxide was added so that it could not be cast. The lead oxide had a pH of about 8.5 in aqueous media. Even when the lead oxide was treated with a little acid in order to try to neutralize it, gelling could not be prevented. Finely divided lead gave similar results. This example illustrates the necessity of using loading pigments or fillers which are essentially neutral.

EXAMPLE XI

The method of this example was similar to the method of Example VIII, above, except that finely divided silica having a specific gravity of about 2.2 was used as the filler. However, due to the low density of the silica a much larger amount was required to get the desired density and resulted in such a viscous mass that the composition could not be cast into molds. This example, thus, illustrates the fact that oxides having relatively high densities must be employed.

EXAMPLE XII

A golf ball core was made according to the method of Example I, above, except that red iron oxide was added to the polyurethane composition in an amount to provide about 28% by weight of the oxide. The composition was then poured into the spherical cavity of a mold having an internal diameter of about 1¼″ and cured. After curing, the ball was tested and it exhibited a drop rebound of about 80. The ball was then wrapped with cured rubber thread under tension, placed between balata composition cover shells and hot molded. A pressure-cured standard natural rubber-rubbery butadiene-1,3/styrene copolymer composition core, which exhibited a drop rebound of about 60, was similarly wrapped and covered to form a golf ball. On driving tests the distance obtained with the golf ball with the polyetherurethane composition core was about 7 yards greater than the distance achieved with the ball having the natural rubber/synthetic rubber core. This example, thus, shows the excellent results obtained when using the novel composition of the present invention as a golf ball core as compared to a conventional natural rubber/synthetic rubber composition.

In summary, the present invention teaches that highly resilient polyetherurethane compositions can be made from certain polyalkylene ether glycols, polyols and aromatic diisocyanates in certain amounts. The compositions are readily castable and can be cured without the necessity of using pressure or heavy molding equipment. The composition and method of the present invention will find utility wherever a highly resilient polyetherurethane is desired such as in the manufacture of playing balls, particularly in making cores for golf balls.

I claim:

1. In combination, a golf ball having a core, a thread wrapped center about said core and a molded cover about said center, said core comprising a highly resilient polyetherurethane composition comprising the reaction product of a mixture of (1) 2 chemical equivalents of a polyalkylene ether glycol having an average molecular weight of from about 1,000 to 5,000, having from 4 to 8 carbon atoms in its alkylene groups and being a liquid at a temperature below about 100° C., (2) from about 0.45 to 2.0 equivalents of an aliphatic polyol soluble in said glycol and having from 3 to 40 carbon atoms and from 3 to 8 hydroxyl groups selected from the group consisting of primary and secondary hydroxyl radicals and being free of nitro groups and of amino hydrogen atoms, and (3) from about 2.45 to 4.0 equivalents of an aromatic diisocyanate soluble in said glycol, the equivalents of said diisocyanate being at least equal to the total of the equivalents of said glycol and said polyol.

2. In combination, a golf ball according to claim 1, in which said mixture contains additionally a finely divided, inert, dispersed filler selected from the group consisting of metals and metal oxides having a specific gravity of from about 5 to 9, having a pH of about 7 in aqueous media, having about 90% of its particles passing a 100 mesh U.S.S. screen and being present in an amount of from about 25 to 100 parts by weight per 100 parts by weight of the resulting polyetherurethane.

3. In combination, a golf ball according to claim 1, in which said mixture contains additionally a very minor amount by weight, based on the weight of the resulting polyetherurethane, of an alkali metal salt of an organic acid as a catalyst.

4. In combination, a golf ball according to claim 1, in which said glycol is polytetramethylene ether glycol, said polyol is trimethylol propane, and said diisocyanate has the formula

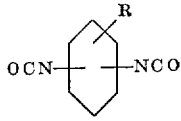

where R is selected from the group consisting of hydrogen and methyl.

5. In combination, a golf ball having a core, a tension wrapped center about said core and a molded cover about said center, said core containing a highly resilient polyetherurethane which is the reaction product of a mixture of (1) 2 chemical equivalents of polytetramethylene ether glycol of a moleular weight of about 3000 (2) about 0.50 chemical equivalent of trimethylol propane and (3) about 3 chemical equivalents of para-phenylene diisocyanate, and said core also containing about 25 to 100 parts by weight, per 100 parts of said polyetherurethane, of red iron oxide dust.

References Cited in the file of this patent

UNITED STATES PATENTS

| | | |
|---|---|---|
| 697,421 | Kempshall | Apr. 8, 1902 |
| 1,545,848 | Penfold | July 14, 1925 |
| 2,729,618 | Muller | Jan. 3, 1956 |
| 2,805,072 | Smith | Sept. 3, 1957 |
| 2,854,422 | Nichols | Sept. 30, 1958 |
| 2,866,774 | Price | Dec. 30, 1958 |
| 2,912,414 | Schultheis et al. | Nov. 10, 1959 |
| 2,929,794 | Simon et al. | Mar. 22, 1960 |

FOREIGN PATENTS

| | | |
|---|---|---|
| 733,624 | Great Britain | July 13, 1955 |
| 769,091 | Great Britain | Feb. 27, 1957 |

UNITED STATES PATENT OFFICE
CERTIFICATE OF CORRECTION

Patent No. 3,098,658        July 23, 1963

Walter T. Murphy

It is hereby certified that error appears in the above numbered patent requiring correction and that the said Letters Patent should read as corrected below.

Column 4, line 15, for "particulay" read -- particularly --; line 17, for "hldroxyl" read -- hydroxyl --; same column, line 25, after "N,N'-" insert -- bis --.

Signed and sealed this 11th day of February 1964.

(SEAL)
Attest:

ERNEST W. SWIDER
Attesting Officer

EDWIN L. REYNOLDS

Acting Commissioner of Patents